United States Patent [19]
Christie et al.

[11] 4,431,76(
[45] Feb. 14, 1984

[54] CODED POLYMERIC MATERIAL AND METHOD

[75] Inventors: William F. Christie, Westfield, N.J.; Lawrence A. Smalheiser, Spring Valley, N.Y.

[73] Assignee: Stauffer Chemical Company, Westport, Conn.

[21] Appl. No.: 90,967

[22] Filed: Nov. 5, 1979

[51] Int. Cl.³ .............................................. C08K 3/34
[52] U.S. Cl. ................................ 524/443; 252/408.1; 524/403
[58] Field of Search .............. 525/4; 260/37 M, 42.22, 260/42.49; 252/408, 301.36, 301.1 R; 524/443

[56] References Cited

U.S. PATENT DOCUMENTS

| | | | |
|---|---|---|---|
| 3,366,573 | 1/1968 | Feuer | 252/301.1 |
| 3,663,685 | 5/1972 | Evans | 424/1 |
| 3,772,099 | 11/1973 | Ryan et al. | 149/18 |
| 3,772,200 | 11/1973 | Livesay | 252/301.1 F |
| 3,835,782 | 9/1974 | Griffith et al. | 102/27 F |
| 3,861,886 | 1/1975 | Meloy | 44/5 |
| 3,862,066 | 1/1975 | Reiter et al. | 526/344. |
| 3,897,284 | 7/1975 | Livesay | 149/2 |
| 3,912,927 | 10/1975 | Rush et al. | 250/30 |
| 4,053,433 | 10/1977 | Lee | 252/40 |

Primary Examiner—Paul R. Michl
Attorney, Agent, or Firm—Richard P. Fennelly

[57] ABSTRACT

Polymeric materials, for example, vinyl materials contain an added trace amount of a compound which is detectable by an instrumental method of analysis in the absence of the step of freshly exposing a surface of the sample and without substantial interference from other ingredients in the vinyl material. The incorporation of the added trace compound allows for coding of the material and provides a means to later identify the manufacturer of the film without the need to affix more visible identification means thereto.

3 Claims, No Drawings

CODED POLYMERIC MATERIAL AND METHOD

BACKGROUND OF THE INVENTION

1. Field of the Invention

The present invention comprises a coded polymeric material identifiable by instrumental analytical techniques and to the method of identifying said material.

2. Description of the Prior Art

Polymeric materials, e.g., vinyl materials, comprise a selected polymer or polymers optionally combined with various functional additives (for example, lubricants, stabilizers, plasticizers, fillers, antioxidants, colorants, antistatic agents, flame retardants, processing aids, and/or the like). These polymeric materials can be formed into a final desired commercial product by the use of conventional forming procedures (for example, calendering, extrusion, compression molding, and the like). Quite often, these materials, at some point between the time of manufacture and ultimate acquisition by the user, will be devoid of any visible indicia (e.g., labels, tags, or the like) giving the identity of the manufacturer. If the goods are defective or do not conform to the desired performance specifications, it may be difficult to ascertain what manufacturer is responsible for suitable action in the event of deviation in the anticipated quality of the goods. Hence, a need exists for a means to code such goods, without placing visible indicia on the goods which can be removed therefrom, said coding means being quickly and easily detected and identifiable during any point in the commercial sales history of the goods.

In U.S. Pat. No. 3,912,928 to J. B. Rush et al., it is proposed that polymeric materials be coded with the incorporation in the material of a small amount of a particular phosphor so as to be identified at a later date. The process shown in this patent comprises the step of freshly exposing a surface of the coded material so that the phosphor particles can be bombarded with radiant energy to emit radiant energy which is visually identifiable by the human eye. Such a procedure involves the labor intensive step of freshly exposing a surface of the sample. The process also has the disadvantage of not being taught or suggested as being useful with instrumental methods of identification. Such instrumental methods can be more rapid, more accurate, and less labor intensive than the use of visual identification by the human eye.

SUMMARY OF THE INVENTION

The present invention is a suitably coded polymeric material containing an added trace amount of a compound which is detectable and identifiable by instrumental methods of analysis without substantial interference from the other ingredients in the polymeric material. The terminology "trace amount" as used herein is intended to encompass those detectable and identifiable amounts of the added compound which do not also produce an appreciable functional effect on the physical properties of the polymeric composition. The present method involves the addition of a suitable trace amount of a suitable coding element which would be detectable and identifiable by use of instrumental methods of analysis to the polymeric material, the impression of energy upon the coded polymeric material in the absence of the step of freshly exposing a surface of the coded material, and detecting emitted energy from the coded sample by instrumental methods of analysis to identify the sample.

DESCRIPTION OF PREFERRED EMBODIMENTS OF THE PRESENT INVENTION

The detailed description of the present invention given hereinafter is of a vinyl material which is coded so as to be detectable by means of X-ray fluorescence. It is to be understood, however, that other polymeric materials and other methods of instrumental analysis of detection can also be employed in practicing the invention as also described hereinafter.

Polymeric materials, for example, vinyl film materials, are generally formed by admixing the polymer, e.g., a vinyl chloride polymer with selected suitable amounts of various functional additives, including at least one of the following additives: lubricants, stabilizers, plasticizers, fillers, antioxidants, colorants, antistatic agents, flame retardants, processing aids, and the like. Thus, the polymeric material will generally comprise a complex mixture of various types of compounds and thus will commonly contain a number of elements. The elements frequently found in vinyl materials due to the presence of these functional additives and normal contamination in the vinyl chloride polymer component are as follows:

Aluminum
Antimony
Barium
Boron
Bromine
Cadmium
Calcium
Carbon
Chlorine
Chromium
Cobalt
Copper
Iron
Lead
Magnesium
Manganese
Mercury
Molybdenum
Nickel
Phosphorus
Selenium
Strontium
Sulfur
Tin
Titanium
Tungsten
Zinc The compound which is added to the polymeric material, e.g., vinyl chloride material, to make it detectable by the chosen method of instrumental analysis, e.g., X-ray fluorescence, is one which does not contain any of the predominant elements normally present in the polymeric material and which can be detected by the selected method of instrumental analysis without undue interference from those elements that might be present. Representative compounds which should be used in vinyl materials contain at least one of the following elements so as to fulfill these criteria when X-ray fluorescence is the chosen method of instrumental analysis:

Gallium
Germanium
Rubidium

Yttrium
Zirconium
Niobium
Ruthenium
Rhodium
Palladium
Silver
Indium
Tellurium
Iodine
Cesium
Lanthanum
Cerium
Proseodymium
Europium
Gadolinium
Terbium
Dysprosium
Holmium
Erbium
Thulium
Ytterbium
Hafnium
Tantalum
Iridium
Platinum
Gold
Bismuth Several of these elements can possibly be eliminated from consideration in vinyl materials when X-ray fluorescence is to be used due to cost considerations, possible toxicity considerations, and, in some situations, due to possible X-ray fluorescence line overlap with those elements normally in the particular vinyl sample which is to be coded. However, the listing given above provides a representative selection list that can be considered by the person of ordinary skill in the art depending upon the precise formulation which is to be coded.

X-ray fluorescent techniques, for example, are most useful with compounds containing at least one coding element having an atomic weight which is greater than about 40. It has been found, for example, that zirconium can be especially used to advantage as the coding element, for example, in the form of zirconium silicate, since it is low in cost, has good compatibility with various vinyl formulations, has good X-ray fluorescence sensitivity of detection, and generally will not interfere with other elements contained in the vinyl formulation. It is easily detectable quantitatively, except when high amounts of lead compounds are present in the material, in which case its detection is semi-quantitative.

Generally, the selected coding element or elements will be added to the polymeric material in finely divided form, e.g., of sufficiently small size to pass a sieve having an opening of about 37 microns, so as to mix easily with the formulation used in making the polymeric material. The amount of the coding element which is used should be sufficiently great to be detectable and identifiable by the selected instrumental method of analysis, but not great enough to produce an appreciable functional effect on the physical properties. Generally, use of amounts ranging from about 35 ppm. to about 200 ppm. or more, can be easily detected in vinyl materials when X-ray fluorescence is used. For example, in the case of zirconium silicate, a level of 35 parts by weight of zirconium silicate per one million parts by weight of vinyl chloride resin is sufficient.

In X-ray fluorescence, for example, the polymeric material is inserted into the analysis instrument, without any need for sample pretreatment, such as exposing a fresh surface of the sample, and is bombarded with X-rays. The resulting X-rays emitted by fluorescence from the sample are characterized by wavelength and intensity, thereby simultaneously giving both a quantitative and qualitative analysis of the coding element. The method is sensitive, selective, and rapid (about 10 minutes for an evaluation) and requires no preliminary sample preparation. Various information can be coded into the material using the particular identity of the coding element or elements and the respective amount or amounts as keys to what information is intended (for example, name of manufacturer, plant location, date of manufacture, etc.)

Although the foregoing discussion of preferred embodiments of the present invention has been in terms of use of X-ray fluorescence in vinyl materials, the method is one of general applicability to other polymeric materials using other instrumental methods of analysis. The particular type of polymeric material, instrumental method of analysis and coding element can be varied quite widely to achieve the desired results.

The polymeric material can be selected from the natural or synthetic rubbers or any synthetic polymeric material. Representative polymeric materials include vinyl choride polymers, ABS polymers, acetal polymers, acrylic polymers, alkyd polymers, allyl polymers, amino polymers, cellulosic polymers, epoxy polymers, fluoroplastics, furan polymers, ionomer materials, melamine resins, nitrile resins, nylon, phenol-aralkyl resins, phenolic resins, phenyleneoxide based resins, poly(amide-imide) resins, polyaryl ether resins, polybutylene resins, polycarbonate resins, polyester resins, the polyolefin resins, polyimide resins, polymethylpentene resins, polyphenylene sulfide resins, polystyrene, polyurethane, silicone resins, styrene-acrylonitrile resins, sulfone polymers, thermoplastic elastomers, and urea resins. Further details regarding these plastics can be found in Modern Plastics Encyclopedia, Volume 54, No. 10A, October 1977, pp. 6–121.

A variety of known instrumental methods of analysis can also be used to impress energy upon the coded material so as to obtain emission of an amount of energy which is detectable and identifiable by the instrumental analytic apparatus.

Some representative techniques that can be used include the following:

Neutron activation analysis: The sample is bombarded with neutrons making various elements radioactive. The radioactive elements have specific particle and particle energy emissions which can be characterized.

Atomic absorption spectroscopy: The sample is dissolved in a suitable solvent, and the solution is injected into a flame. Light of a suitable wavelength is beamed through the flame. The attenuation of the light is proportional to the amount of the element being detected.

Emission spectroscopy: The sample is placed in an electric arc struck between two carbon electrodes. The elements present emit characteristic wavelengths which are separated by a prism or diffraction grating. The separated wavelengths are captured on film, and the intensity of each line or group of lines for a given element defines the presence and quantity of such an element.

X-ray diffraction: The sample is bombarded with X-rays. An X-ray detector on a goniometer measures the strength of the refracted X-rays at different angles. The angle of refraction is a characteristic of the various chemical compounds in the sample.

Flame photometry: This technique is similar to atomic absorption spectroscopy. The solution containing the dissolved sample is injected into a flame. The flame emits characteristic light wavelengths for each element. A diffraction grating separates the desired wavelengths for measurement by a photocell. The strength of each desired wavelength is proportional to the concentration of the element or elements in the sample.

Polarography: An electric current is passed through a solution containing the sample. Inorganic ions and some organic compounds are amenable to analysis by this procedure. One electrode which is used in this method is a fresh mercury electrode (dropping mercury electrode). The voltage and current needed to reduce an ion to a lower electron state is measured and is characteristic of the ion or organic compound.

Spark-source mass spectrometry: Inorganic compounds in the sample are vaporized and ionized in a mass spectrometer by a spark. The mass spectrometer separates the ions by mass and charge. A photographic plate captures the "picture" of the separated ions for identification by usual mass spectrometry mass-charge techniques.

Electron probe microanalysis: A finely focused beam of electrons is used to excite an X-ray spectrum characteristic of the elements in the sample.

The present invention is illustrated by the Example which follows:

EXAMPLE

This Example illustrates the results obtained when zirconium silicate was added at differing levels to various vinyl films and was measured by X-ray fluorescence. The Table given below sets forth the film thickness, the amount of zirconium silicate actually added and the amount of zirconium silicate that was detected. The vinyl films were formed by mixing the vinyl film forming composition and selected amount of zirconium silicate at 163–177° C. in a 2-roll mill until homogeneously mixed and then by extracting the desired film thickness therefrom.

| Film No. | Thickness (mils) | ZrSiO$_4$ Added (ppm) | ZrSiO$_4$ Detected (ppm) |
|---|---|---|---|
| 1 | 2.0 (51 microns) | 0 | 0 |
|   |   | 35 | 33 |
|   |   | 75 | 72 |
|   |   | 150 | 157 |
| 2 | 8.0 (203 microns) | 0 | 0 |
|   |   | 35 | 38 |
|   |   | 75 | 72 |
|   |   | 150 | 143 |
| 3 | 8.0 (203 microns) | 0 | 3 |
|   |   | 35 | 34 |
|   |   | 75 | 76 |
|   |   | 150 | 158 |
| 4 | 8.0 (203 microns) | 0 | 1 |
|   |   | 35 | 31 |
|   |   | 75 | 77 |
|   |   | 150 | 157 |
| 5 | 8.0 (203 microns) | 0 | 7 |
|   |   | 35 | 52 |
|   |   | 75 | 84 |
|   |   | 150 | 147 |
| 6 | 8.0 (203 microns) | 0 | 0 |
|   |   | 35 | 26 |
|   |   | 75 | 61 |
|   |   | 150 | 141 |

The foregoing Example is presented merely for illustrative purposes and should not be construed in a limiting manner. The scope of protection that is sought is set forth in the claims which follow.

What is claimed:

1. A polymeric material, that can be formed into a final commercial product, which is coded for later identification by an instrumental method of analysis by the presence therein of an added trace amount of a zirconium silicate coding element only which is detectable and identifiable by said instrumental method of analysis in the absence of the step of freshly exposing a surface of the material and without substantial interference from other ingredients in the material.

2. A vinyl chloride polymeric material, that can be formed into a final commercial product, which is coded for later identification by an instrumental method of analysis by the presence therein of an added trace amount of a zirconium silicate coding element only which is present at from about at least 35 parts by weight per one million parts by weight of polymeric material and which is detectable and identifiable by said instrumental method of analysis in the absence of the step of freshly exposing a surface of the material and without substantial interference from other ingredients in the material.

3. A vinyl chloride polymeric material, that can be formed into a final commercial product, which is coded for later identification by an instrumental method of analysis by the presence therein of an added trace amount of a zirconium silicate coding element only which is present at from about 35 to about 200 parts by weight per one million parts by weight of polymeric material and which is detectable and identifiable by said instrumental method of analysis in the absence of the step of freshly exposing a surface of the material and without substantial interference from other ingredients in the material.

* * * * *